A. KRAUTH.
AUTOGRAPHIC MANIFOLDING AND CASH REGISTER.
APPLICATION FILED MAR. 8, 1916.
1,307,679.
Patented June 24, 1919.
5 SHEETS—SHEET 1.
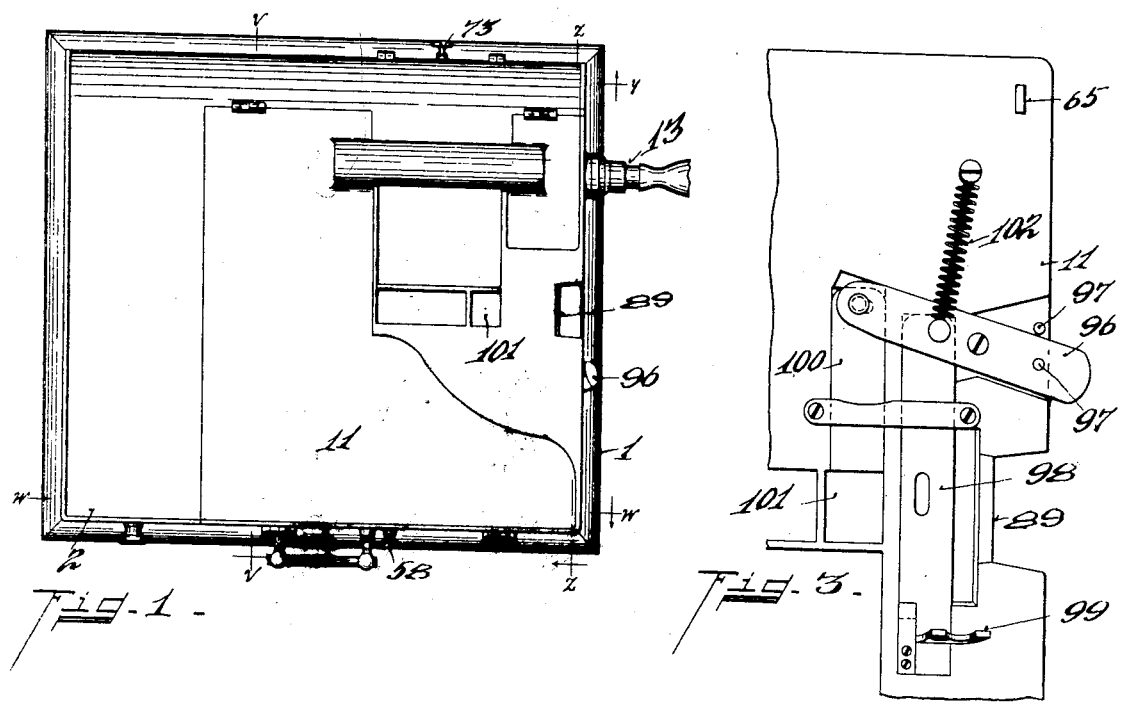
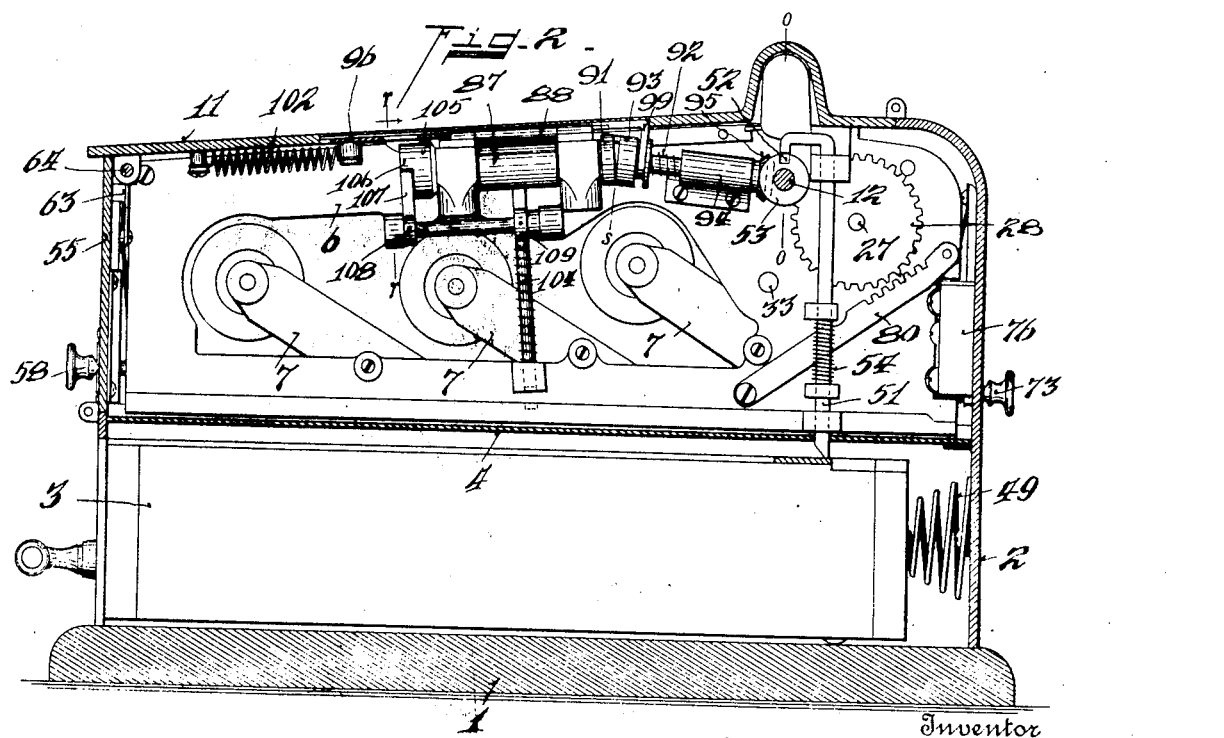

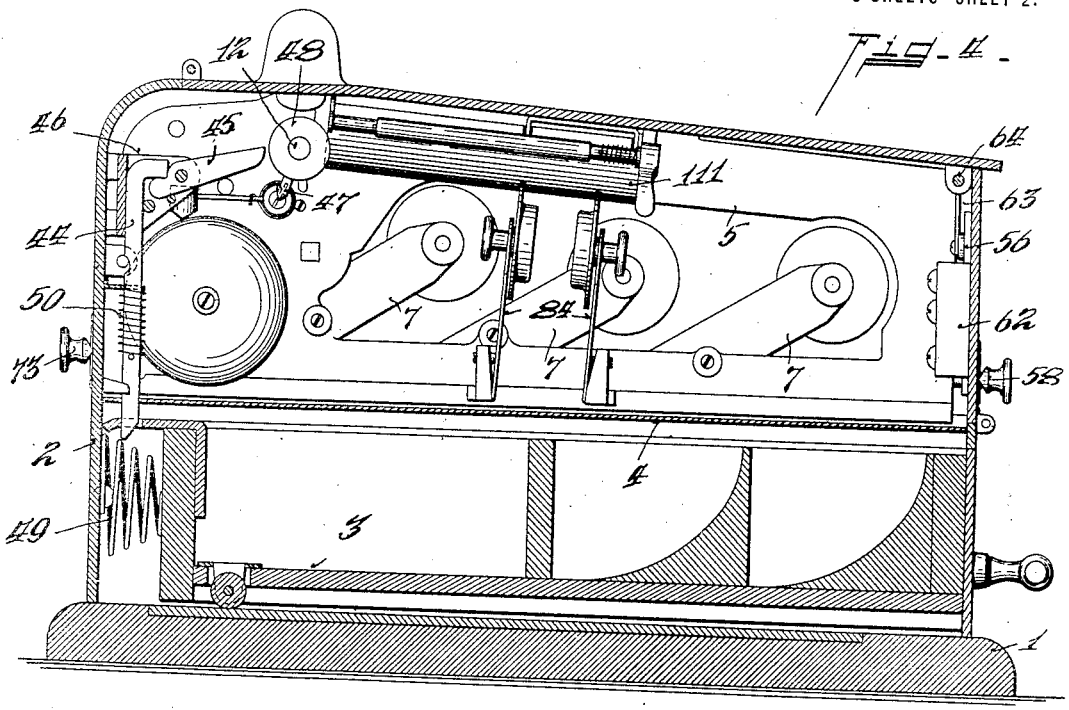
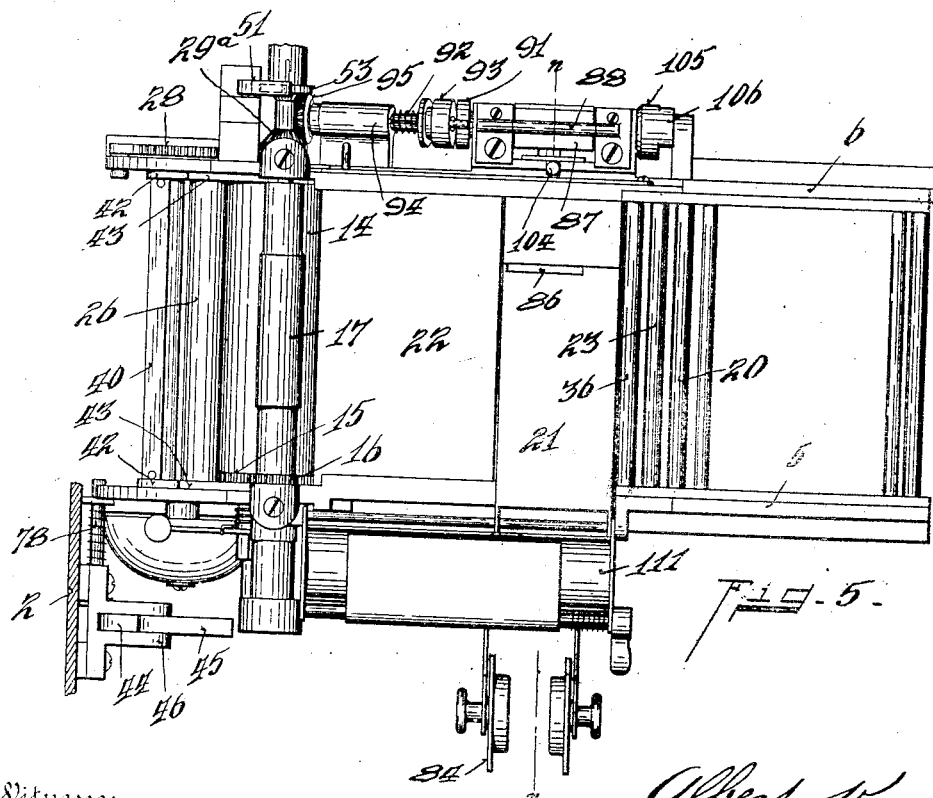

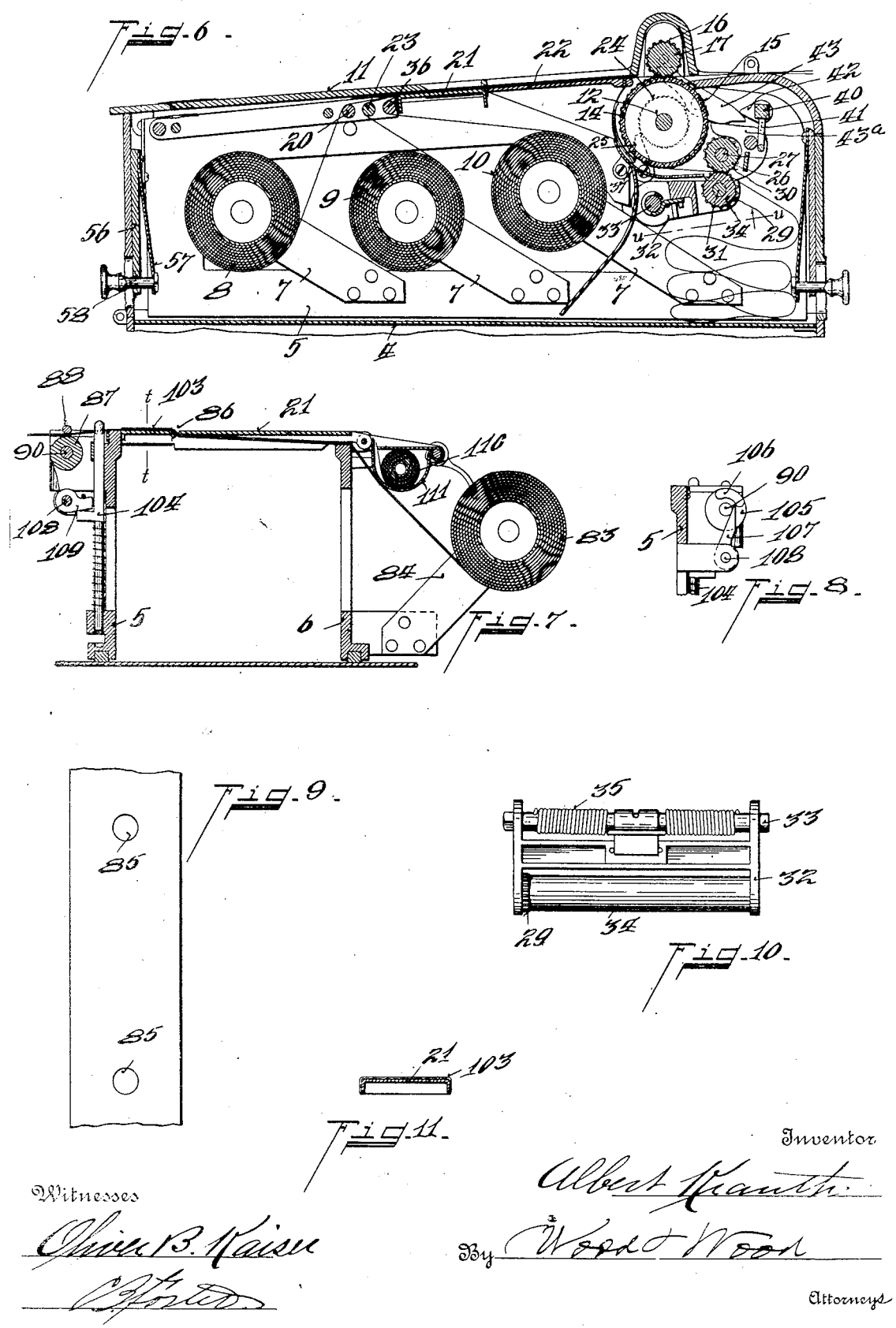

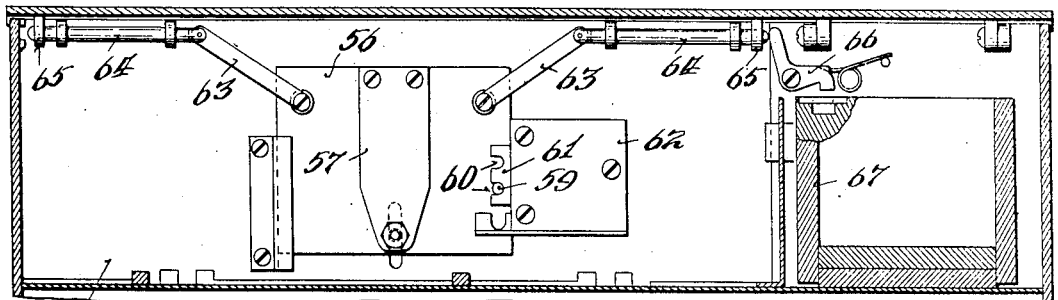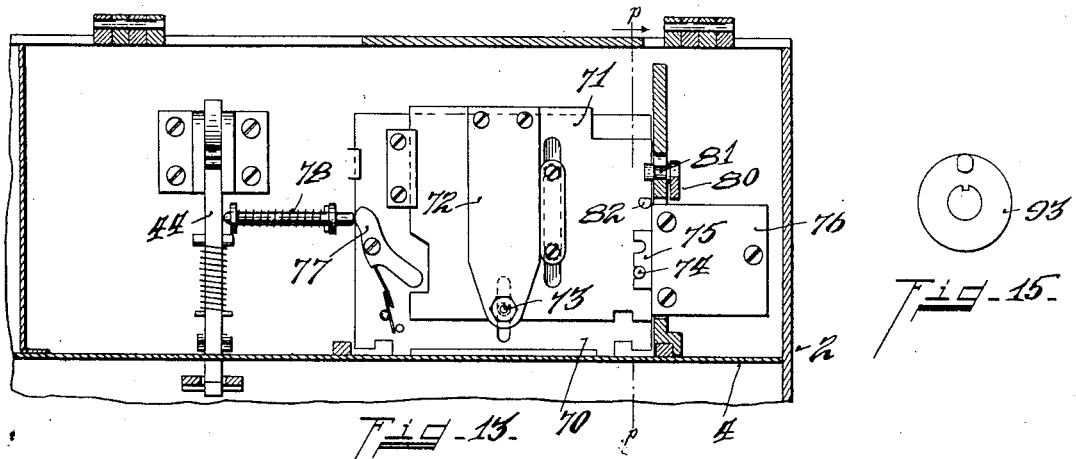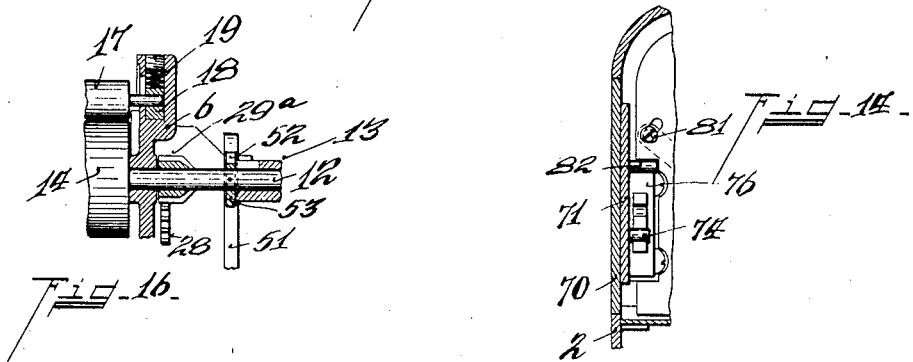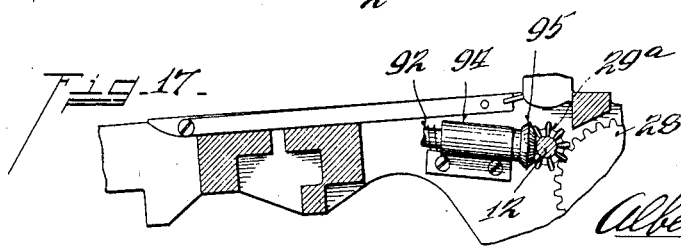

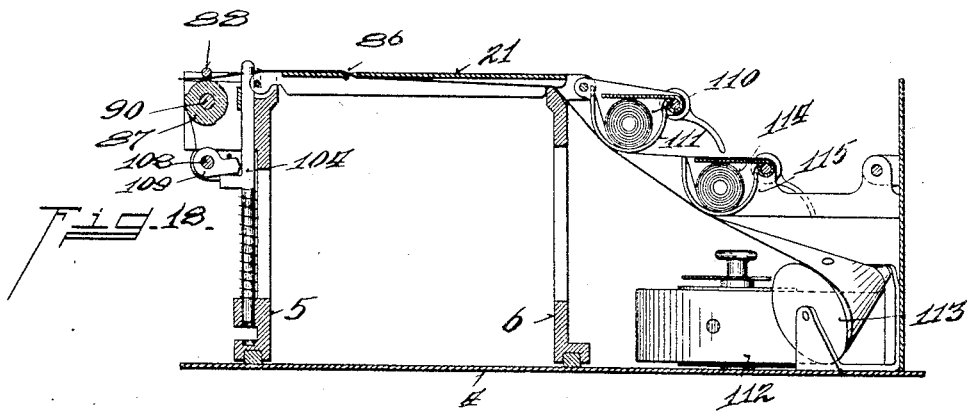
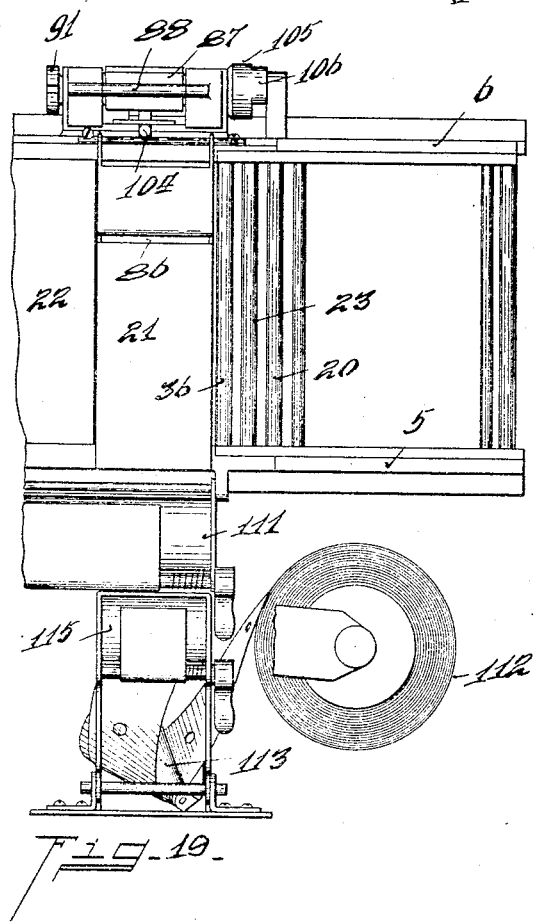

UNITED STATES PATENT OFFICE.

ALBERT KRAUTH, OF HAMILTON, OHIO, ASSIGNOR TO KRAUTH & BENNINGHOFEN, A FIRM CONSISTING OF ALBERT KRAUTH AND CHRISTIAN BENNINGHOFEN, OF HAMILTON, OHIO.

AUTOGRAPHIC MANIFOLDING AND CASH REGISTER.

1,307,679.     Specification of Letters Patent.     Patented June 24, 1919.

Refiling of application Serial No. 554,699, filed April 11, 1910. This application filed March 8, 1916. Serial No. 82,964.

*To all whom it may concern:*

Be it known that I, ALBERT KRAUTH, a citizen of the United States, and residing at Hamilton, in the county of Butler and State of Ohio, have invented a new and useful Improvement in Autographic Manifolding and Cash Registers, of which the following specification is a full disclosure.

My invention relates to manifolding machines or autographic registers, and particularly to the mechanism for feeding or withdrawing several webs or sheets of paper in relative different determined lengths for varied service purposes, and in limiting the withdrawal in a measured length to an operative cycle, whereby in the control of sheets, an entry on an original or first sheet may be manifolded upon the others, either in the entirety or in portions thereof, and the form length of each sheet is brought into proper and corresponding registry and positioned for a subsequent operation.

The machine comprises several distinct types of paper feeding devices for obtaining the different results of manifolding as to the measured length of paper feed or withdrawal from the machine. These are operatively connected to a single manipulative handle for a cycle control, and in this connection are combined in a machine having a sliding cash-drawer, which in its open and closed position controls the operation of the operating handle. The machine in its combined form is adapted to deliver one or duplicate sheets in a measured length, at each rotation or cycle of the crank handle, containing a complete record of an entry, feed another sheet in a lesser degree which contains only a portion of the complete entry record, as a summary of the entry, and adapt another sheet to be withdrawn, which may contain a summary or proportional record of the complete original of a measured length in differential proportion, from the positive or determined feed imparted through the rotation of the crank handle.

Such sheet herein is utilized as a premium check, containing a summary of an original entry, and in which the feeding mechanism advances the sheet to an extent sufficient to be manually grasped and pulled for a full withdrawal.

An object of the invention is to provide paper feeding means for advancing or withdrawing several superimposed sheets in differential measured degrees in a single operative cycle, and also to advance and release one thereof to an extent adapting it to be manually grasped and withdrawn for a determined length.

Another object of the invention contemplates the provision of paper feeding devices operating upon a strip of paper longitudinally provided with determinately spaced apertures, adapted serially to be brought into registry and alinement with intercepting means for engagement therewith to limit the paper withdrawal, together with means under the control and operated by said feeding means for functioning said intercepting means.

Another object of the invention is to combine a sales-recorder and cash-drawer operated and under the control of a single crank handle or operating device for precautionary and safety measures and provide for its operation in cycles.

Various other objects and features of the invention relate to feeding one of the strips or web of paper transversely to another; to blocking the entry space over the strips to prevent making a manifolding entry upon one or some of the superimposed strips and coördinately control the feeding mechanism of such strip during the service or non-service periods; to locking means for serially or independently controlling the locking of a series of doors or drawers when closed, either as to all or some of them, all of which will be more fully contained in the description of the accompanying drawings, illustrating a preferred embodiment of the invention, and forming a part hereof, and in such drawings like characters of reference denote corresponding parts throughout the several views, of which:—

Figure 1 is a top plan view of my register. Fig. 2 is an enlarged section on line z, z, Fig. 1. Fig. 3 is a bottom plan view of a portion of the hinged margin-frame. Fig. 4 is an enlarged section on line v, v, Fig. 1. Fig. 5 is a top plan view of the autographic sales strip register portion of the machine. Fig. 6 is a central vertical section through the same. Fig. 7 is a section on line n, n, Fig. 5. Fig. 8 is a section on line r, r, Fig. 2. Fig. 9 is a plan view of a portion of the premium check strip. Fig. 10 is a bottom plan view of one of the summary feed rolls and frame therefor, taken along a line u, u, Fig. 6. Fig. 11 is a section on line t, t, Fig. 7. Fig. 12 is a section on line w, w, Fig. 1. Fig. 13 is a section on line y, Fig. 1. Fig. 14 is a section on line p, p, Fig. 13. Fig. 15 is a plan view of the clutch member controlling the feed to the premium check feeding means, taken on line s, Fig. 2. Fig. 16 is a section on line o, o, Fig. 2. Fig. 17 is a view of the transmission gearing to the premium check feeding mechanism. Fig. 18 is a transverse section through the autographic register portion of the machine illustrating a modified form of premium check strip reel support and carbon support. Fig. 19 is a top plan view of the same.

Referring to the drawings, 1 indicates a base plate of the machine, 2 a casing or housing secured thereon and 3 a cash-drawer having casters or rollers at its rear end riding upon the base 1 for sliding the drawer within the casing. Above the drawer a plate 4 is secured within the casing providing an upper closure for the drawer and a support for the manifolding or autographic register apparatus.

Upon the plate 4 a pair of side frames 5, 6 are secured or supported, each carrying a web supporting arm 7 arranged respectively in opposing pairs yielding toward each other for supporting under tension webs of paper therebetween.

In the drawings three pairs of web holders are provided for respectively supporting the webs 8, 9 and 10. Two of the webs, say 8 and 9, comprise in the strip, blank forms of definite length, as sales slips, which when fed in a superimposed relation over a writing table move in registry and alinement as to the form data for making an exact manifold record from one onto the second of each entry. The third web 10 may comprise a blank strip of paper upon which a summary entry is recorded.

The number of webs employed is optional, depending upon the different trade requirements.

The casing top has a portion 11 thereof hingedly mounted serving as a margin frame for exposing a form length of the strip or sub-division thereof and defining an entry space or spaces.

*Paper feeding devices.*

A shaft 12 is journaled in the side frames 5, 6, (see Figs. 1, 2 and 6,) projecting through the side of the casing 2, to which the crank handle 13 is detachably secured. A feed roll 14 is fixed to the shaft 12, having a gear 15 upon one end thereof, intermeshed with a pinion 16 fixed to the axis of the second feed roll 17, journaled in the slide-block 18, slidably supported in the side frames 5, 6. 19 represents springs exerting tension against each of the slide blocks 18, for maintaining the roll 17 yieldingly against the roll 14, and between which rolls the original and duplicate sales strips are fed. The original sales strip is fed from the supply web 8 over guide roller 20, beneath the margin-frame and over the sectional writing-table 21, 22, between the feed rollers 14, 17, thence between the end of the margin frame and top of the casing 2, outside of the casing. The sheet length is severed from the strip by pulling the paper across the edge of the margin-frame, which is provided with a knife edge. The duplicate strip is fed from the supply roll 9 over the guide roller 23, thence between the margin-frame and sectional writing-table, following with the original.

The writing-table is preferably formed in two sections 21, 22, with each section hinged to the side frames and in which the table section 21 preferably swings transversely to the direction of feed of the strips, while the section 22 swings forward for convenience in loading the machine.

A ratchet wheel 24 is fixed to the shaft 12 preferably adjacent to the gear 15, and a spring controlled pawl 25 pivoted to the side frame 5 engages the ratchet wheel 24, to prevent reverse rotation of the shaft 12. A summary record strip feed roll 26 is fixed to the shaft 27 journaled in the side frames 5, 6, one end of which is provided with a gear 28, see Figs. 2 and 17, in mesh with a pinion 29ª fixed to the main shaft 12. The opposite end of the shaft 27 has a pinion 30 fixed thereon, in mesh with the pinion 29 fixed upon the shaft 31, journaled in the swinging frame 32, the frame 32 being pivoted upon the rod 33 fixed between the side frames 5, 6, see Figs. 6 and 10. The shaft 31 carries a feed roll 34 coöperating with feed roll 26. A spring 35 coiled upon the rod 33 with its ends fixed thereto and its intermediate portion engaging the swinging frame 32, yieldingly maintains the feed roll 34 in engagement with feed roll 26.

Thus, the summary record strip is fed from the supply roll 10, over the guide roller 36, thence between the margin-frame 11 and table section 21, thence downward between the table sections 21, 22, between the guide plate 37, fixed to the side frames 5, 6, and feed roll 14, thence between the feed rolls 26, 34, and deposited upon the supplemental base 4, as shown in Fig. 6.

The guide rollers 20, 23, 36, are preferably journaled upon the frame pivoted to the side frames 5, 6, adapting the same to be swung upward to afford free access to the paper roll supports for reloading or the like.

In reloading or adjusting the strips it is desirable to separate the feed rollers from contact with each other, for offering a free passage of the paper, and this is preferably accomplished as follows:

A rock shaft 40 is journaled within the side frames 5, 6, (see Fig. 6). The shaft 40 has a U-shaped rod 41 providing a hand hold for rocking the shaft. The shaft 40 is further provided with a pair of cams 42, one fixed upon each end thereof within the side frames, each respectively adapted to engage a cam lever 43, pivoted to the side frames, the levers 43 engaging the axis of the feed roller 17 for moving the same upwardly away from the feed roller 14, in one rocking motion of shaft 40. The levers 43 are also each adapted to engage a respective bell-crank lever 43ª, pivoted to the side frames, with one arm of each of said bell-crank levers engaging the swinging frame 32, for releasing rolls 26, 34, simultaneously with the release of rolls 14, 17.

Cash drawer control.

With each revolution of the crank handle 13, the cash-drawer 3 is released and automatically slid to open position, with the return of the drawer to normal closed position necessary before a second crank revolution can be made.

An L-shaped latch bar 44, slidably mounted upon the rear wall of the casing 2, see Fig. 4, has one end projected to engage into an orifice formed in a ledge plate on the top of the drawer 3 for locking the drawer in its closed position. A lever 45 is pivotally mounted on the bracket 46 secured to the rear wall of the casing 2; one end of said lever engaging the L-portion of the latch-bar 44, with its opposite end projected into the path of the pin 47, extended from the disk 48 fixed to the main shaft 12, so as to trip the lever 45 with each revolution of the shaft 12, raising the latch-bar 44, and disengaging the same from the drawer 2, such operation releasing the cash drawer to be moved outwardly automatically under the released tension of the spring 49, fixed to the rear wall of the casing 2, which spring is again compressed in sliding the drawer back to normal closed position.

A second latch-bar 51 slidably mounted within guide projections, extended from the side frame 6, see Fig. 2, and provided with a U-shaped bent end, is adapted to engage with a notch 52, formed in the periphery of the disk 53 fixed to the main shaft 12. This bar 51 is urged downwardly by a spring 54 so that when the bar is released it will automatically engage with the notch 52. The opposite end of the latch-bar 51 is adapted to engage upon the top edge surface of one of the sides of the drawer 2 at the rearward extremity thereof, to raise the latch-bar to free it from the notched engagement with the disk 53, releasing the main shaft 12.

Thus, as the drawer moves out, the latch-bar 51 is released for engagement upon the periphery of the notched disk 52, and with the rotation of the shaft 12 bring the notch and U-shaped end of the latch-bar into registry for locking the shaft against rotation, and requiring the cash-drawer to be returned to normal position before the shaft is again released.

Casing door control and locking system.

As illustrated, I have provided the casing with two hinged doors, one for the front wall and a second for the rear wall, the front door providing means for gaining access to the autographic register portion of the machine, and the rear door affording access to the summary record strip and manipulating means, for releasing the tension on the feed rolls.

The doors and various operative parts are, by a system of locking devices, controlled from a common point, for locking the same against manipulation in one instance; in a second instance rendering some inoperative while releasing others; and in a third releasing all.

The rear wall of the casing above the cash-drawer has a door 55 hinged thereto (see Figs. 2, 6 and 12) swinging outwardly. Upon the inside of the door a plate 56 is slidably mounted with a leaf spring 57 secured at one end to the plate and the opposite end of the spring provided with a pin 58 projecting through a slot in the door and serving as a detent to engage with one of a series of three notches formed upon the front face of the door to retainingly confine the slide-plate in an adjusted position.

59 represents a pin projecting from the plate 56, and adapted to occupy a position to engage into any one of the notches 60, formed on the lock bar 61, projecting from the casing of a lock 62. The lock may be of commercial form, fixed to the door 55. 63 represents links pivotally connected to the slide-plate 56, each pivotally connected to a slide bolt 64, slidably mounted in lugs, projecting from the door, and adapted to engage through orifices formed in the depending lugs 65 projecting from the margin-frame 11, for locking said margin-frame in its closed position. 66 represents a spring-controlled bell-crank lever pivoted to the front wall of the casing 2, with one arm in the path of lock bolt movement, to swing its opposite arm into engagement with a drawer 67, for locking the same upon a movement of the slide-plate 56, to its third position.

As illustrated, in Fig. 12, the lock or slide-plate 56 occupies its intermediate position, in which the drawer 67 is released, but the margin-frame 11 is locked.

Thus, it is possible to open the drawer 67, which serves as a utility drawer, without affording access to the interior of the machine or exposing its operative elements. Moving the slide-plate 56 to its third position, to bring the pin 59 into alinement with the second lock-bar notch 60 will lock all the parts, and bringing the slide plate to the lowest or first position will release all the parts.

The rear door 70 is similarly provided with a slide-plate 71, leaf spring 72, pin 73 connected thereto projecting through a slot in the door, and likewise adapted to engage into any one of three notches for governing the position of slide-plate 71. A pin 74 projecting from the slide-plate is adapted to engage within the notches of the lock-bar 75, of the lock 76, being substantially the same in construction and operation as that described for the front door.

But, in this instance, the door itself is locked against opening by the overlapping engagement of the slide-plate 71, with the rear wall of the casing when the plate is moved to its second and third positions. 77 represents a spring-controlled lever pivotally mounted upon the door 70, one arm of which projects into a notch formed in the slide-plate 71, for swinging said lever, upon upward movement of the slide-plate, with its opposite arm engaging the end of a spring-controlled lock bolt 78, slidably mounted upon the rear wall of the casing, and adapted to engage into a notch or orifice formed in the releasing latch-bar 44, see Figs. 4 and 13, thereby locking the drawer, when the slide-plate 71 is moved to its third position, giving sufficient movement to the lever 77, to push the bolt 78 into engagement with the drawer releasing bar 44, the bolt returning to normal position automatically upon moving the slide-plate into its second or first position.

To lock the main shaft 12 against rotation, I provide a rack lever 80, see Figs. 2 and 13, pivotally mounted on the frame 6, with its teeth adapted to intermesh with the gear 28, driving the summary strip feed rollers. 81 represents a pin projecting from the free end of said lever and adapted to be engaged by a pin 82 extended from the slide-plate 71.

The pin 81, upon movement of the slide plate 71 to its third position, will swing the lever 80, to engage its teeth with the gear 28, arresting the movement of said gear and main driving shaft.

*Differential length paper withdrawal.*

In addition to the sales and summary strip feeding devices heretofore referred to, I provide mechanism for feeding a strip of paper in a direction transverse to said former feeding devices, herein designated as a premium check strip. The relative direction of feed between the several strips in the combination herein is one merely for convenience and accessibility and for proportional registry. The feeding devices for the premium strip connect with the crank handle 13 to provide a unity of operation between the several strips for each crank handle cycle.

In this class of machines it has been found impractical to accurately mechanically feed several strips and maintain their registry in coincident length relation unless alining means are provided in conjunction therewith, and greater difficulties are encountered in feeding the strip in different lengths and maintaining a proportional registry relation. Therefore, the mechanical feed for the premium strip in each crank handle cycle feeds or advances the strip to an extent sufficient to project the same to enable the same to be manually grasped and pulled for a withdrawal length. The strip longitudinally is provided with apertures in a definitely spaced relation and alinement and in the withdrawal of the strip and brought into registry with a member yieldingly urged toward a face of the strip and adapted to engage through the registering aperture intercepting the strip withdrawal. The strip lengths, therefore, can be of any size to meet the trade requirements. Each strip length is brought and arrested in accurate registry relation to a second or several strips in manifold arrangement, and are not disturbed by any variance in the ratio of feed resulting from the mechanical feeding devices therefor.

The premium strip is small in width, divided into check lengths, each containing appropriate data printing and a space for the summary entry, and issued to a customer, of a percentage value to the amount of the summary entry for premium or discount purposes of cash sales. The feeding mechanism is arranged so that it can be readily thrown out of commission, disengaging the same from the crank handle transmission and the entry space over the premium strip blocked, as when it is desired to make a charge entry for which no premium check is issued.

A web of paper 83 is mounted between the web supporting tension arms 84. The web or strip, as shown in Fig. 9, longitudinally and preferably medially thereof is provided with definitely spaced apertures 85, defining paper withdrawing limits. The paper passes beneath the writing table section 21 and upwardly through a slot 86 in the table and then over the table to and between the feed rolls 87, 88, said rolls being mounted and journaled in bearings projecting from the side frame 5, (see Figs. 7, 8, 18 and 19). The feed roller 87 is preferably of cam or segmental form, whereby a portion of its periphery frictionally engages with its companion feed roll 88 in each revolution. Thus with each revolution of the rolls the strip is advanced or fed to project beyond the rolls sufficiently to enable it to be manually grasped and withdrawn until arrested and the length then severed by tearing the same across the knife edge 89 formed upon the margin frame 11.

The feed roller 87 is fixed to a shaft 90, yieldingly mounted in its bearing, so as to exert an upward tension upon the feed roller 87, when its cam portion engages with its companion feed roller 88. The shaft is mounted or journaled in slide-blocks, with a coil spring engaging each block of similar construction, as that shown in Fig. 6, employed in mounting the sales strip feed roller 17. A clutch disk 91 fixed to the feed roll shaft 90 engages with a sliding clutch member 93 mounted upon and rotating with the shaft 92. Said shaft 92 is suitably journaled in a bearing 94, projected from the side frame 6, and 95 represents a beveled gear fixed to the shaft 92 in mesh with the beveled gear portion of the gear 29ª upon the main shaft 12. Thus motion is conveyed from shaft 12, through gear 29ª, beveled gear 93, shaft 92, clutch members 93, 91, to the feed roll shaft 90, upon each revolution of the crank handle 13.

It is desirable at times to cut out this premium strip feed, and to likewise close the aperture in the margin-table over the premium check entry space. This is accomplished as follows, see Figs. 1, 2 and 3:—

A lever 96 is pivotally mounted upon the under face of the margin-frame 11, preferably being of elastic form, and provided with an orifice to engage over the pins 97, projecting from the margin-frame, for guiding and locking the lever in its shifting movement from one position to a second. A slide plate 98 is pivotally connected with the lever 96, and slidably mounted upon the under face of the margin-frame 11, and provided with a yoke arm 99, projected downwardly and adapted to engage into the peripheral groove of the clutch member 93, for throwing the latter into and out of engagement with the clutch member 91, upon manipulation of the lever 96. A second slide-plate 100 is pivotally connected to the lever 96, and slidably mounted upon the under face of the margin-frame 11, to close the aperture or writing space 101, formed in the margin-frame 11, over that portion of the premium strip fed over the writing-table section 21. A spring 102, having one end fixed to the lever 96 and its opposite end to the margin-frame, is provided for exerting tension upon the lever 96 to return it to normal position, when released from its engagement with the pin 97, opening the writing aperture 101, and move the clutch member 93 into engagement with the clutch member 91.

To make a manifold summary entry upon the premium check, an ink ribbon 103, is provided over that portion of the table section 21, across which the premium strip passes, with the premium strip fed between the table section and ribbon.

The length of strip withdrawal to each crank handle cycle is determined by the spacing of the apertures 85, through which the intercepting means engages, and the entry space on the strip proportional from each aperture, a distance equal to that between intercepting means and writing-table. The intercepting means comprises a spring actuated plunger 104 slidably mounted in the side frame 5, with one end thereof projecting upwardly for engaging the lower surface of the premium strip and adapted to engage through an aperture 85 in the strip when brought into registry see Fig. 7.

With the plunger 104 under tension, engaging a surface of the strip, it will quickly snap into its paper intercepting position when an aperture in the paper is brought in registry therewith, and, therefore, is not dependent upon any time operation relative to a prescribed length of paper withdrawal. Any slight variation in length between the several sheet or check lengths does not interfere with the proper operation of the plunger 104 and the alinement and registry of each subsequent check length with the entry space or manifold strip is assured.

To release the plunger 104 from its paper engagement, I provide the feed shaft 90, with a cam 105, having a cam projection 106, adapted to engage the lever arm 107, fixed to the rock shaft 108, see Fig. 8, said rock shaft being suitably journaled in brackets projecting from the side frame 5. A second arm 109 is fixed to the rock shaft 108, adapted to engage with the plunger 104.

Thus as the feed shaft 90 is rotated, it will cause the cam 106, to engage with the lever arm 107, swing the same toward the side frame 5, and the arm 109 downward, depressing the plunger 104, withdrawing the same from its paper intercepting elevation, prior to the feeding engagement between the feeding rolls 87, 88, whereby the premium strip is released and fed forward by the feed rolls. After the arm 107 is released from its engagement with the cam 106, the plunger 104 is free to press against the under surface of the premium strip, until the premium strip is manually withdrawn to a point, to bring the plunger 104 into registry with a second orifice 85.

A carbon-paper roll or ink ribbon is mounted in the carbon-holding receptacle 111, (see Fig. 7) and fed over the writing sections 21, 22, between the several strips common in the art of autographic registers for making manifold impressions.

In Figs. 18 and 19 I have shown the premium strip or web roll 112 supported with its axis vertical and the web as fed from its supply roll passing over a conical guide roller 113 for twisting or flexing the web to bring its surface horizontally and parallel with the writing table portion over which it passes. A second carbon or ink ribbon receptacle 115 is provided for supporting and housing an ink ribbon roll 114 with its web adapted to extend to lie over the premium strip upon the writing table.

Having described my invention, I claim:—

1. A device of the nature disclosed, combining a casing from which a strip of paper is withdrawn, the strip having apertures in spaced relation longitudinally with its direction of withdrawal, a pair of feed rolls, one thereof having a segment coöperating with the other in each revolution for advancing the paper to a position where it can be grasped by the fingers and alternately freeing the paper from roll transmitting engagement for a continued manual withdrawal, and means adapted to engage through a registering aperture in the paper to intercept the same.

2. In a machine of the class described, a casing, a pair of feed rolls coöperating during a portion of their revolution to feed the paper a predetermined distance exterior of the casing for manual grasp, means adapted to project through perforations formed in said strip of paper for arresting said strip after a predetermined length of withdrawal, and means in connection with said arresting means actuated through the rotation of said feed rolls, to release said arresting mechanism during the roll feed.

3. In a manifolding machine comprising a suitable frame work from which a strip of paper is withdrawn, the combination with a platen over which said paper passes, of a vertically depressible pin located adjacent an end of said platen that engages said paper, means for moving said pin downward below the plane of the platen, and a pair of paper feeding rolls between which the paper passes, coöperating partially in each revolution of one of them to advance the paper for a determined distance.

4. In a manifolding machine comprising a suitable frame work inclosing a strip of paper having a longitudinally disposed series of alining perforations, in combination with a pair of feed rolls, one thereof having a segment coöperating with the other in each revolution to initially advance the paper a distance less than that between said perforations to a position where it can be grasped by the fingers, and a vertically disposed depressible pin arranged to enter said perforations *seriatim*.

5. In a manifolding machine comprising a suitable frame work inclosing a strip of paper having a longitudinally disposed series of alining perforations, in combination with a pair of feed rolls, one thereof having a segment coöperating with the other in each revolution to initially advance the paper a distance less than that between said perforations to a position where it can be grasped by the fingers, a vertically disposed depressible pin arranged to enter said perforations *seriatim*, and means coördinately operating with said rolls for depressing said pin in advance of a paper feeding operation.

6. In a manifolding machine comprising a suitable frame work inclosing a strip of paper having a longitudinally disposed series of alining perforations, in combination with a pair of feed rolls, one thereof having a segment coöperating with the other in each revolution to initially advance the paper a distance less than that between said perforations to a position where it can be grasped by the fingers, a vertically disposed depressible pin arranged to enter said perforations *seriatim*, and means coördinately operating with said rolls for depressing said pin in advance of a paper feeding operation, and holding said pin depressed during the paper feeding operation of said rolls.

7. In a manifolding machine comprising a suitable frame work inclosing a strip of paper having a longitudinally disposed series of alining perforations, in combination with a pair of feed rolls, one thereof having a segment coöperating with the other in each revolution to initially advance the paper a distance less than that between said perforations to a position where it can be grasped by the fingers, a vertically disposed depressible pin arranged to enter said perforations *seriatim*, and means for depressing said pin.

8. In a manifolding machine comprising a suitable frame work inclosing a strip of paper having a longitudinally disposed series of alining perforations, a depressible pin situated at one end of the said frame work, entering said perforations *seriatim*, means for withdrawing said pin from its paper engagement, and a pair of rolls coöperating for a partial revolution of one of them for advancing the strip therebetween and providing a non-strip engaging interim.

In witness whereof I hereunto subscribe my name as attested by the two subscribing witnesses.

ALBERT KRAUTH.

Witnesses:
 F. G. DRISBACH,
 OLIVER B. KAISER.